(12) United States Patent
Stein et al.

(10) Patent No.: US 11,448,359 B2
(45) Date of Patent: Sep. 20, 2022

(54) ADJUSTABLE PLANT STAND ASSEMBLY

(71) Applicant: ATT Southern LLC, Orlando, FL (US)

(72) Inventors: Robert Stein, Camp Hill, PA (US); Chun Hung, Dillsburg, PA (US)

(73) Assignee: ATT Southern LLC, Orlando, FL (US)

( * ) Notice: Subject to any disclaimer, the term of this patent is extended or adjusted under 35 U.S.C. 154(b) by 52 days.

(21) Appl. No.: 16/903,875

(22) Filed: Jun. 17, 2020

(65) Prior Publication Data
US 2021/0396347 A1  Dec. 23, 2021

(51) Int. Cl.
*F16M 11/24* (2006.01)
*A47G 7/04* (2006.01)

(52) U.S. Cl.
CPC ........... *F16M 11/242* (2013.01); *A47G 7/041* (2013.01); *A47G 2200/12* (2013.01)

(58) Field of Classification Search
CPC ...... F16M 11/242; F16M 11/32; F16M 11/36; F16M 11/22; F16M 11/34; F16M 11/24; A47G 7/041; A47G 7/00; A47G 2200/12
USPC .............................................. 248/27.8; 47/39
See application file for complete search history.

(56) References Cited

U.S. PATENT DOCUMENTS

| | | | | |
|---|---|---|---|---|
| 1,490,650 A | * | 4/1924 | Wagner | A47G 7/041 248/170 |
| 1,495,991 A | * | 6/1924 | Drynan | A47J 36/34 248/172 |
| 2,158,546 A | * | 5/1939 | Lang | A61G 21/00 248/167 |
| 2,210,047 A | * | 8/1940 | Stieglitz | A47C 4/03 108/156 |
| 2,594,187 A | * | 4/1952 | Levitt | A01G 5/00 248/506 |
| 3,327,980 A | * | 6/1967 | Rasmussen | F16M 11/242 248/168 |
| 3,480,250 A | * | 11/1969 | Hankins | F21V 21/06 248/168 |
| 3,618,885 A | * | 11/1971 | Muller | G10G 5/00 248/460 |
| 3,743,225 A | * | 7/1973 | Bochinski | A61G 17/045 248/27.8 |

(Continued)

FOREIGN PATENT DOCUMENTS

CN            202874703 U    4/2013

OTHER PUBLICATIONS https://www.u-buy.com.tw/ . . . lant-caddy-outdoor-plant-stand-garden-plant-caddy-indoor-plant-dolly-20inch-440lbs-capacity/store/kk/dp, "Plant Stand With Wheels—Large Potted Planter Plant Stand On Wheels Round Heavy Duty Plant Dolly Moveable Pedstal Plant Caddy Adjustable Rolling Tray Coaster 14 16 17 20inch 440lbs Capacity", May 8, 2020, 4 pages.

(Continued)

*Primary Examiner* — Nkeisha Smith
(74) *Attorney, Agent, or Firm* — Brooks Kushman P.C.

(57) ABSTRACT

An adjustable plant stand assembly is provided with a baseplate to support a planter. The baseplate has an overall profile. A plurality of upright supports is adjustably connected to the baseplate to support the baseplate above an underlying support surface, to expand relative to the baseplate to support planters of varying sizes, and to retract relative to the baseplate within the overall profile of the baseplate.

19 Claims, 10 Drawing Sheets

(56) References Cited

U.S. PATENT DOCUMENTS

| | | | | | |
|---|---|---|---|---|---|
| 3,981,468 | A | * | 9/1976 | Holan | A47B 45/00 248/167 |
| 4,033,653 | A | * | 7/1977 | Doring | A47B 37/00 312/351.7 |
| 4,319,727 | A | * | 3/1982 | Rattay | A47G 7/041 248/149 |
| 4,640,045 | A | * | 2/1987 | Nesbitt | A01G 9/04 47/67 |
| 5,360,194 | A | * | 11/1994 | Jacobson | F16M 11/242 248/300 |
| 5,368,266 | A | * | 11/1994 | Allen | A47G 7/044 108/47 |
| 5,520,122 | A | * | 5/1996 | Fischer | A47B 1/04 108/71 |
| 5,560,578 | A | * | 10/1996 | Schenken | B60N 3/101 248/229.21 |
| 5,775,233 | A | * | 7/1998 | Kendall | F16M 11/38 108/115 |
| 5,826,121 | A | * | 10/1998 | Cardellini | F16M 13/00 396/428 |
| 5,909,922 | A | * | 6/1999 | Dugas | A47C 7/68 297/188.18 |
| 6,305,653 | B1 | * | 10/2001 | Oldham | F16M 11/04 248/125.8 |
| 6,676,094 | B1 | * | 1/2004 | Brown | F16M 13/022 248/214 |
| 6,719,250 | B2 | * | 4/2004 | FitzSimons | A47J 33/00 126/30 |
| 7,114,288 | B1 | | 10/2006 | Kershaw | |
| D555,389 | S | | 11/2007 | Kershaw | |
| 8,047,498 | B1 | * | 11/2011 | Karty | F16M 11/36 248/545 |
| 8,464,988 | B1 | * | 6/2013 | Walker | A47B 19/10 248/122.1 |
| 8,695,931 | B2 | * | 4/2014 | Hall | A47J 37/0786 248/188.2 |
| 8,757,576 | B2 | * | 6/2014 | Kersting | A01G 5/04 248/354.3 |
| 9,323,134 | B2 | * | 4/2016 | Clark | F16M 11/16 |
| 9,644,785 | B2 | * | 5/2017 | Carpenter | F16M 11/247 |
| 9,784,453 | B2 | * | 10/2017 | Hall | F24C 3/14 |
| 10,025,165 | B2 | * | 7/2018 | Greenthal | H04N 5/247 |
| 10,039,379 | B1 | * | 8/2018 | Phillips | A47F 5/10 |
| D836,936 | S | | 1/2019 | Jeppson | |
| 2008/0311316 | A1 | * | 12/2008 | Marlow | A41G 1/002 428/24 |
| 2009/0236479 | A1 | | 9/2009 | Rose | |

OTHER PUBLICATIONS

Fox & Fern, "Give your plant a stand, Mid-Century Modern Style", Dec. 31, 2014, 8 pages.

* cited by examiner

ADJUSTABLE PLANT STAND ASSEMBLY

TECHNICAL FIELD

Various embodiments relate to plant stands.

BACKGROUND

The prior art has provided plant stands to support planters at a desired elevation for creating a desired design effect or to permit vines or branches of the plant to hang below a depth of the plant.

SUMMARY

According to an embodiment, an adjustable plant stand assembly is provided with a baseplate to support a planter. The baseplate has an overall profile. A plurality of upright supports is adjustably connected to the baseplate to support the baseplate above an underlying support surface, to expand relative to the baseplate to support planters of varying sizes, and to retract relative to the baseplate within the overall profile of the baseplate.

According to a further embodiment, a plurality of retainers extends from the plurality of upright supports above a support surface of the baseplate to retain the planter upon the baseplate.

According to another further embodiment, the plurality of upright supports each extend above a support surface of the baseplate to retain the planter upon the baseplate.

According to another further embodiment, the baseplate has a plurality of recesses formed into the overall profile sized to receive portions of the upright supports.

According to another further embodiment, each upright support is pivotally connected to the baseplate.

According to an even further embodiment, a plurality of links, is each pivotally connected to the baseplate at a pivot axis that is generally perpendicular to the baseplate. Each of the plurality of upright supports is attached to one of the plurality of links to expand and retract relative to the baseplate as the links are pivoted relative to the baseplate.

According to another even further embodiment, the baseplate is generally planar with a support surface. A portion of each of the plurality of links that is exposed outboard of the baseplate has a thickness sized to be generally coplanar with the baseplate support surface to support the planter beyond the baseplate.

According to another even further embodiment, a first plurality of recesses is formed into the overall profile of the baseplate to a limited depth to receive portions of the upright supports, while also providing a limit to a range of retraction of the plurality of upright supports.

According to an even further embodiment, a second plurality of recesses is formed into an underside of the baseplate to provide a limit to a pivotal range of the plurality of links in a direction of expansion.

According to another even further embodiment, the second plurality of recesses limit the pivotal range to a maximum expansion of the links.

According to another further embodiment, a plurality of fasteners each pivotally connect one of the upright supports to the baseplate.

According to another even further embodiment, the plurality of fasteners is each loaded in tension to provide a resistance to pivoting of the upright supports to maintain the upright supports in an adjusted position.

According to another even further embodiment, the plurality of fasteners further provides a plurality of rivets.

According to another further embodiment, the plurality of upright supports further provides at least three upright supports.

According to another further embodiment, the adjustable plant stand assembly is sized to receive and support a planter base with a diameter of six inches in a retracted position.

According to another further embodiment, the adjustable plant stand assembly is sized to receive and support a planter base of with a diameter of eighteen inches in an expanded position.

According to another embodiment, an adjustable plant stand assembly provides a baseplate to support a planter. A plurality of upright supports pivotally connects to the baseplate to support the baseplate above an underlying support surface, to expand relative to the baseplate to support planters of varying sizes, and to retract relative to the baseplate.

According to a further embodiment, the plurality of upright supports retract within an overall profile of the baseplate.

According to another further embodiment, a plurality of links is each pivotally connected to the baseplate at a pivot axis that is generally perpendicular to the baseplate. Each of the plurality of upright supports is attached to one of the plurality of links to expand and retract relative to the baseplate as the links are pivoted relative to the baseplate.

According to another embodiment, an adjustable plant stand assembly is provided with a baseplate to support a planter. The baseplate has an overall profile. A plurality of links each pivotally connect to the baseplate at a pivot axis that is generally perpendicular to the baseplate. A plurality of upright supports each attach to one of the plurality of links to support the baseplate above an underlying support surface, to expand relative to the baseplate to support planters of varying sizes, and to retract relative to the baseplate within the overall profile of the baseplate as the plurality of links are pivoted relative to the baseplate. The plurality of upright supports each extend above a support surface of the baseplate to retain the planter upon the baseplate. A plurality of recesses is formed into the overall profile of the baseplate to a limited depth to receive portions of the upright supports, while also providing a limit to a range of retraction of the plurality of upright supports.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1-18 illustrate an adjustable plant stand assembly 30 according to an embodiment. The adjustable plant stand assembly 30 is utilized for resting upon an underlying support surface 32, such as a floor. The adjustable plant stand assembly 30 is utilized to receive and support a potted planter 34 at an elevation above the floor 32. The plant stand assembly 30 elevates the potted planter 34 for visual aesthetics to raise the potted planter 34 into a range of sight. The plant stand assembly 30 may also be employed to raise a plant away from the ground 32 for plants with leaves, branches or vines that may extend below a depth of the potted planter 34.

The plant stand assembly 30 is adjustable for receiving and supporting potted planters 34 of various diameters. For example, the potted planter 34 in FIG. 1 may have a diameter of approximately six inches.

The plant stand assembly 30 includes a baseplate 36 to receive and support the potted planter upon an upper support surface 38. The plant stand assembly 30 also includes legs 40 as upright supports extending below the baseplate 36 to contact the floor 32, and to support the baseplate 36 upon the floor 32. The legs 40 are each individually adjustable relative to the baseplate 36 to support potted planters of varying sizes. Each of the legs 40 is pivotally connected to the baseplate 36 to expand and retract relative to the baseplate 36 to provide stability suitable for the applicable potted planter 34. Although three legs 40 are illustrated, any suitable number of legs 40 may be employed.

Each of the legs 40 is mounted to a link 42, which is pivotally connected to the baseplate 36. Each link 42 extends horizontally, or near parallel with the baseplate 36. The links 42 are each pivotally connected to the baseplate 36 by a fastener 44 to pivot about a fastener axis, which is generally perpendicular to the baseplate 36 within a suitable tolerance, such as within a few degrees. The fasteners 44 may be installed in tension to provide resistance to pivoting of the legs 40 to mitigate unintentional adjustment of the legs 40. For example, the fasteners 44 are depicted as rivets.

Figure 1:
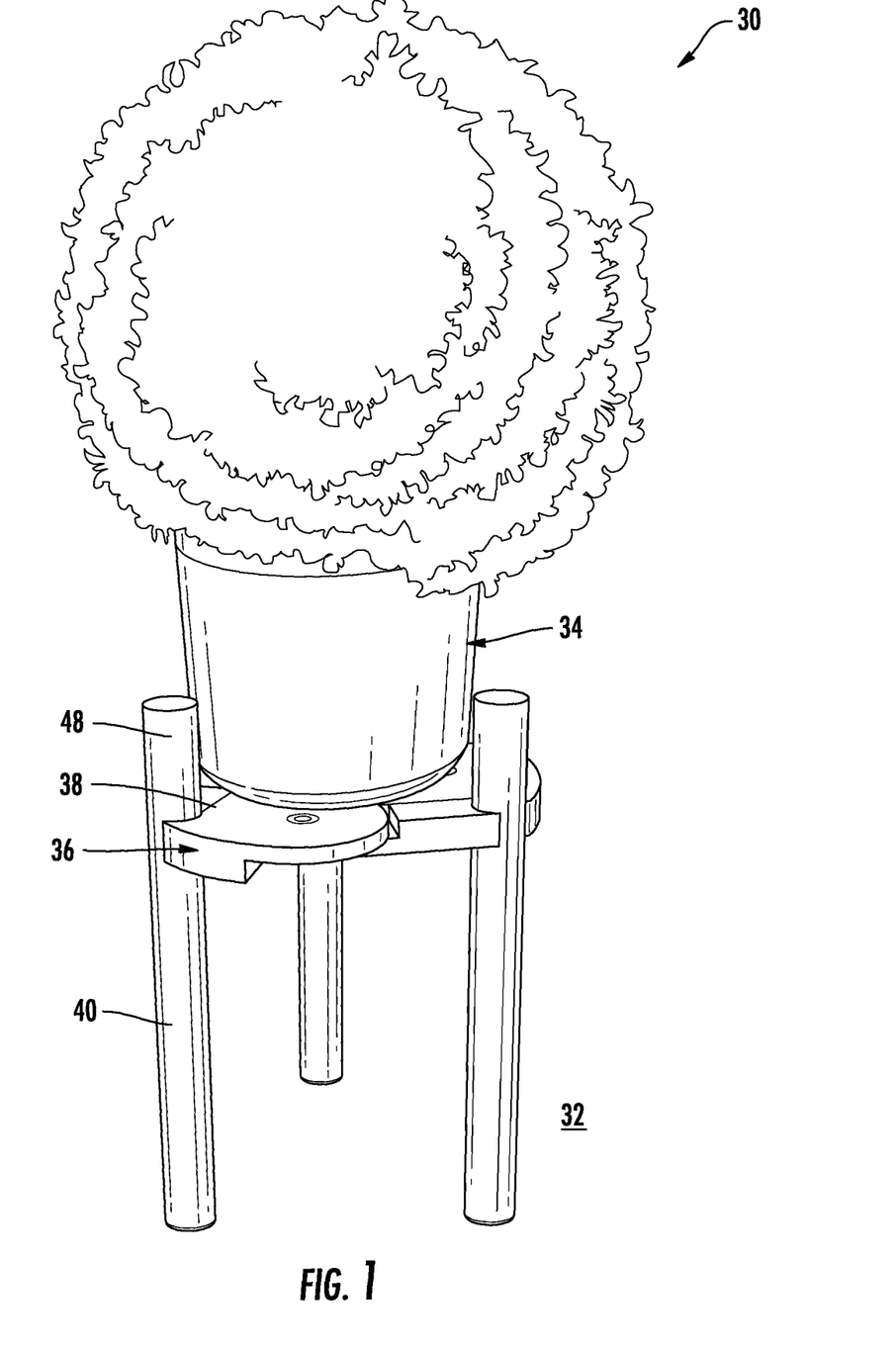
FIG. 1 is a front perspective view of an adjustable plant stand assembly illustrated collapsed and supporting a planter, according to an embodiment.
Figures 2, 3:
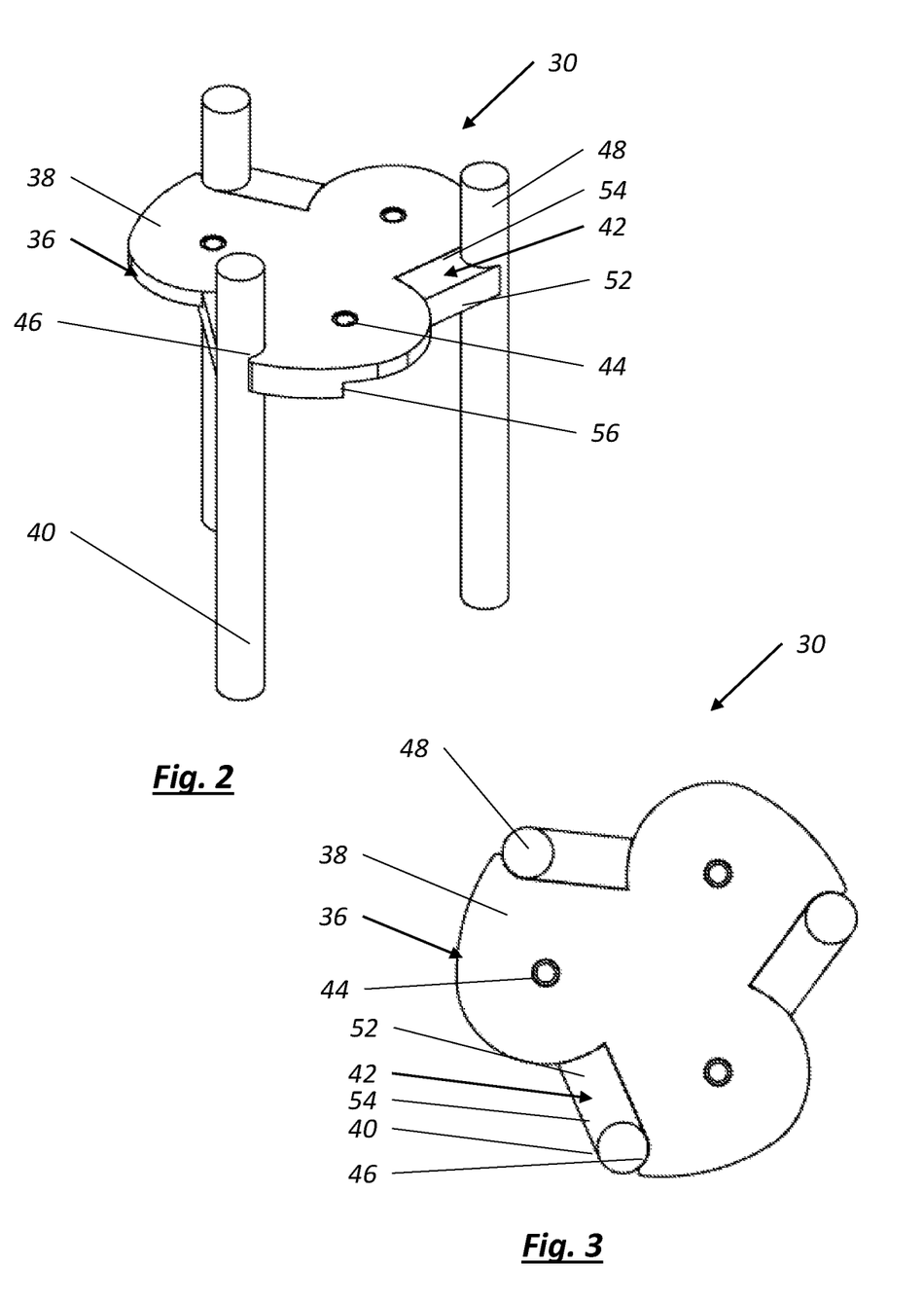
FIG. 2 is a top perspective view of the adjustable plant stand assembly of FIG. 1, illustrated collapsed.
FIG. 3 is a top view of the adjustable plant stand assembly of FIG. 1, illustrated collapsed.
Figure 4:
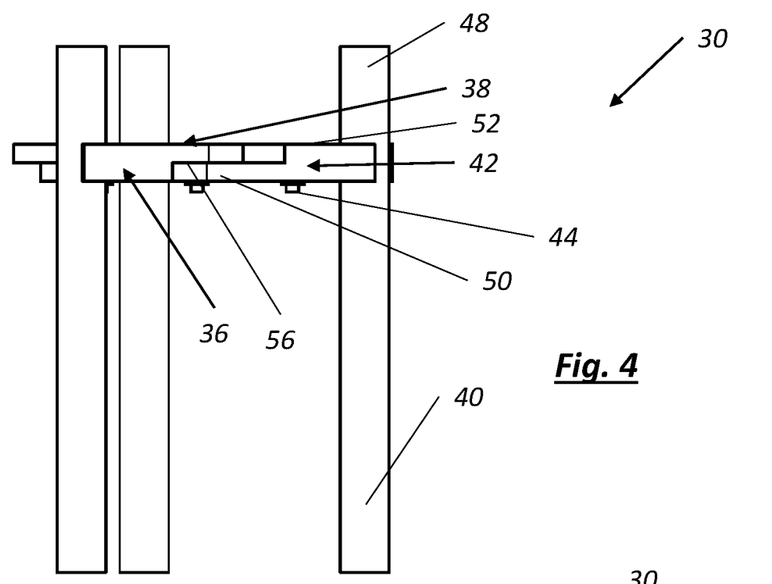
FIG. 4 is a left side view of the adjustable plant stand assembly of FIG. 1, illustrated collapsed.
Figure 5:
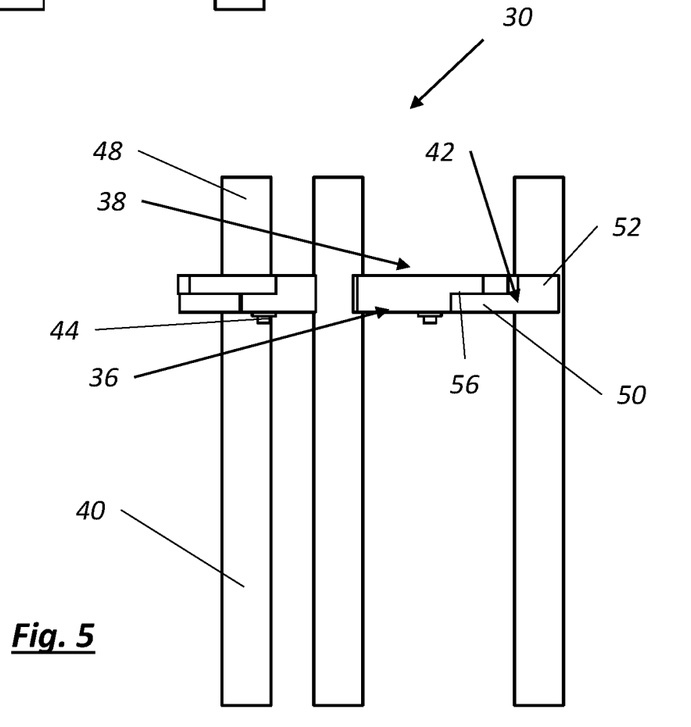
FIG. 5 is a front view of the adjustable plant stand assembly of FIG. 1, illustrated collapsed.
Figure 6:
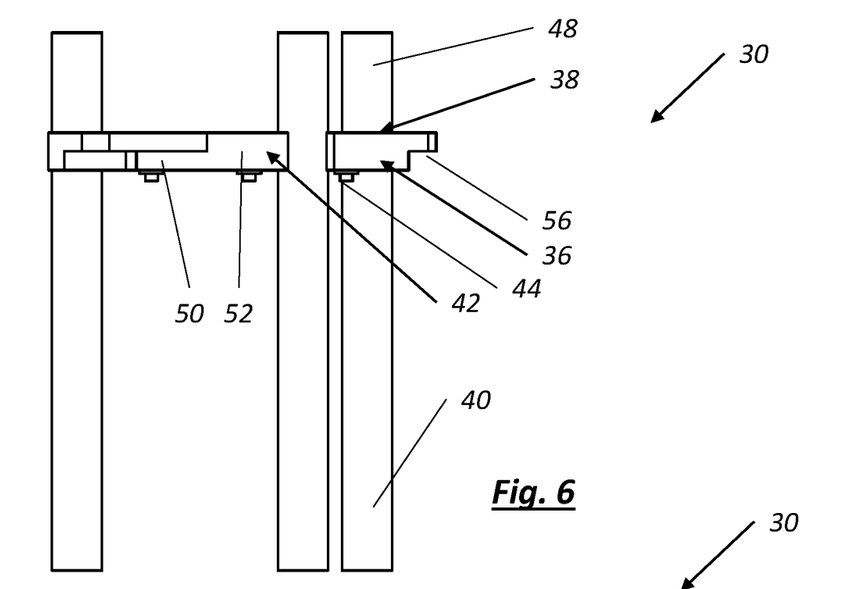
FIG. 6 is a right side view of the adjustable plant stand assembly of FIG. 1, illustrated collapsed.
Figure 7:
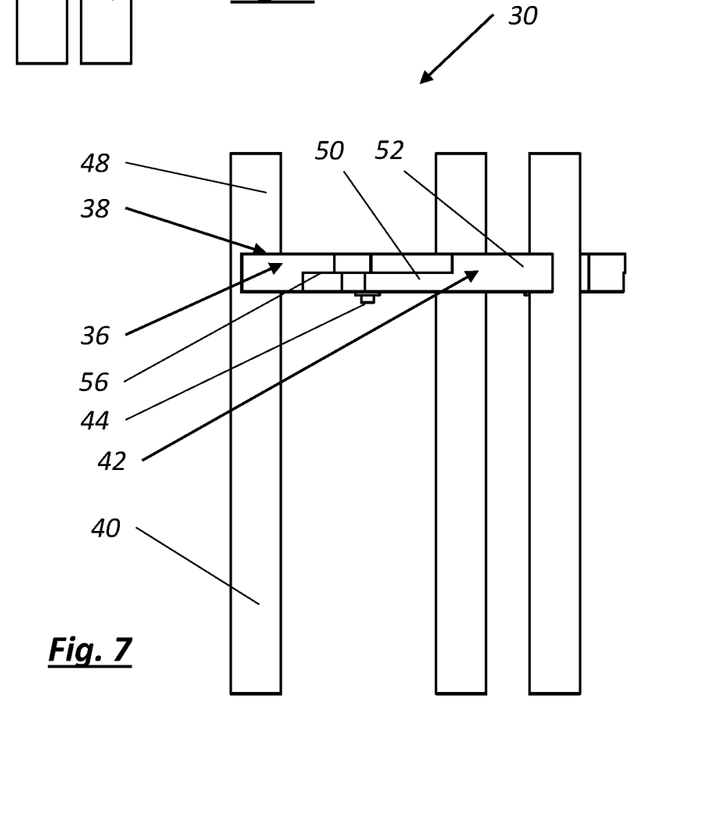
FIG. 7 is a rear view of the adjustable plant stand assembly of FIG. 1, illustrated collapsed.
Figures 8, 9:
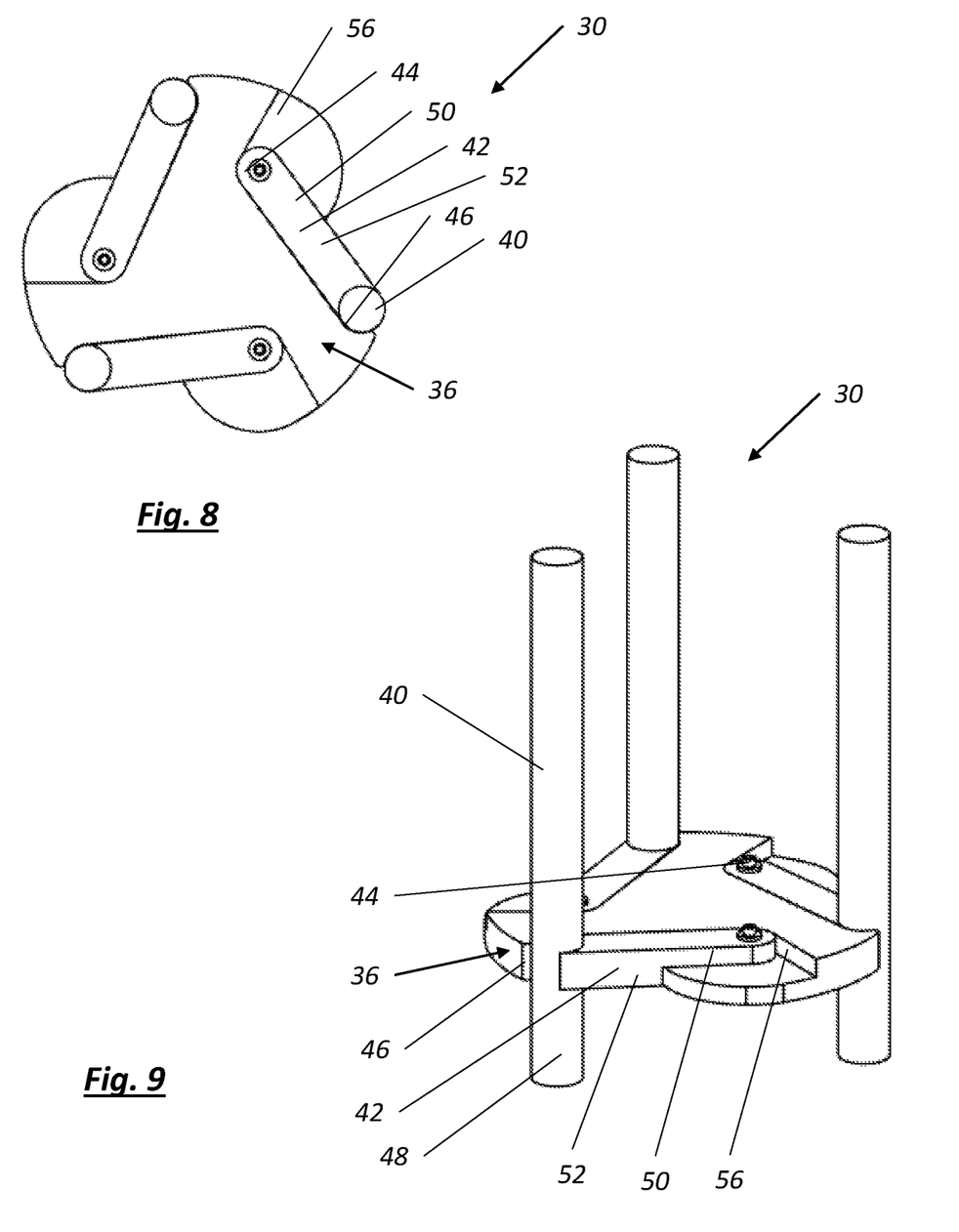
FIG. 8 is a bottom view of the adjustable plant stand assembly of FIG. 1, illustrated collapsed.
FIG. 9 is a bottom perspective view of the adjustable plant stand assembly of FIG. 1, illustrated collapsed.

Referring now to FIGS. 3 and 8, the baseplate 36 has an overall profile. The overall profile of the baseplate 36 includes an actual area of the baseplate 36 plus any openings or recesses formed in baseplate 36 that reduce a surface area of the baseplate 36. The overall profile of the baseplate 36 includes the overall dimensions or diameter of the baseplate 36. For example, packaging for the baseplate 36 is based on the overall profile in order to enclose the baseplate 36.

The baseplate 36 has recesses 46 formed perpendicularly into the baseplate 36 thereby reducing an actual area of the support surface 38. The recesses 46 are formed to a limited depth to receive the portions of the legs 40, and to provide a limit to a pivotal range of the legs 40. The recesses 46 are formed into the overall profile of the baseplate 36 and permit the legs 40 to be pivoted into the recesses 46 as illustrated in FIGS. 2-9. In the collapsed position of the adjustable plant stand assembly 30 of FIGS. 2-9, the legs 40 are pivoted into the recesses 46, and therefore are pivoted into the overall profile of the baseplate 36. Therefore, the collapsed adjustable plant stand assembly 30 occupies the same overall profile as the baseplate 36. This compactness of the collapsed adjustable plant stand assembly 30 significantly reduces packaging size and constraints for the plant stand assembly 30. The compactness increases shipping efficiency and reduces packaging and shipping costs, as opposed to a fixed plant stand assembly or an adjustable plant stand assembly that collapses outside of the baseplate overall profile.

The legs 40 also include upward portions 48 that extend from the links 42 to a height above the baseplate 36. In the collapsed position of the adjustable plant stand assembly 30 in FIGS. 1-9, the upward portions 48 extend through the recesses 46 in the baseplate 36. The upward portions 48 of the legs 40 provide planter retainers to retain the potted planter 34 upon the baseplate 36 about the perimeter of the potted planter 34.

The links 42 each include a proximal portion 50 disposed beneath the baseplate 36. The links 42 each include a distal portion 52 extend outboard of the baseplate 36. The distal portion 52 of each link 42 has an increased thickness so that a top surface 54 of the distal portion 52 is generally coplanar with the support surface 38 of the baseplate 36. The link distal portion top surface 54 contributes to the baseplate support surface 38 to receive and support the potted planter 34.

A second plurality of recesses 56 is formed into an underside of the baseplate 36. The recesses 56 are each provided within a pivotal range of the link proximal portions 50. The recesses 56 provide a limit to the pivotal range of the links 42 at the fully expanded position of FIGS. 10-18.

Figure 10:
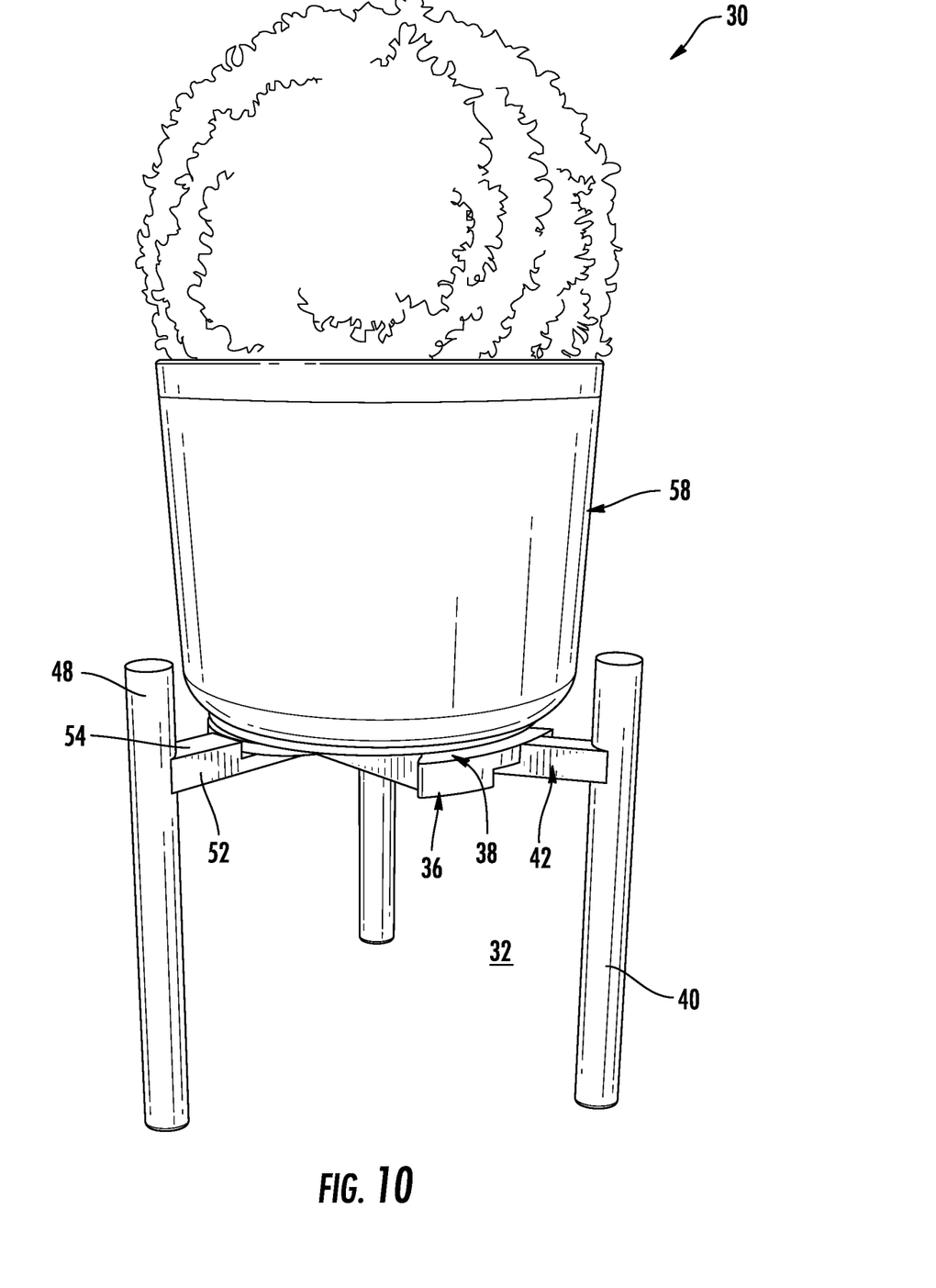
FIG. 10 is a front perspective view of the adjustable plant stand assembly of FIG. 1, illustrated expanded and supporting a planter, according to an embodiment.
Figure 11:
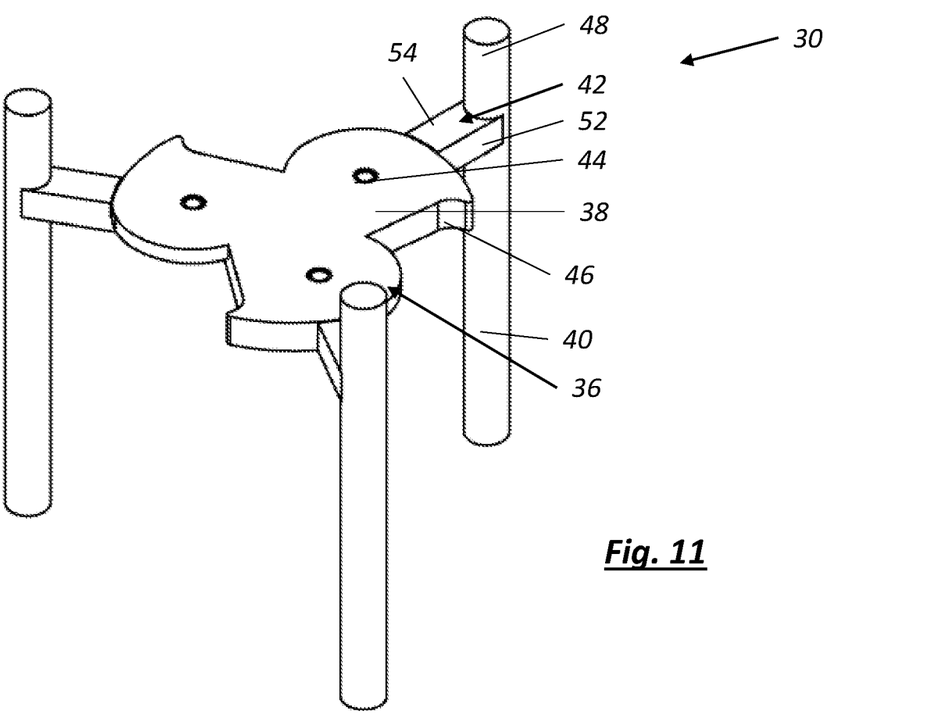
FIG. 11 is a top perspective view of the adjustable plant stand assembly of FIG. 1, illustrated expanded.
Figure 12:
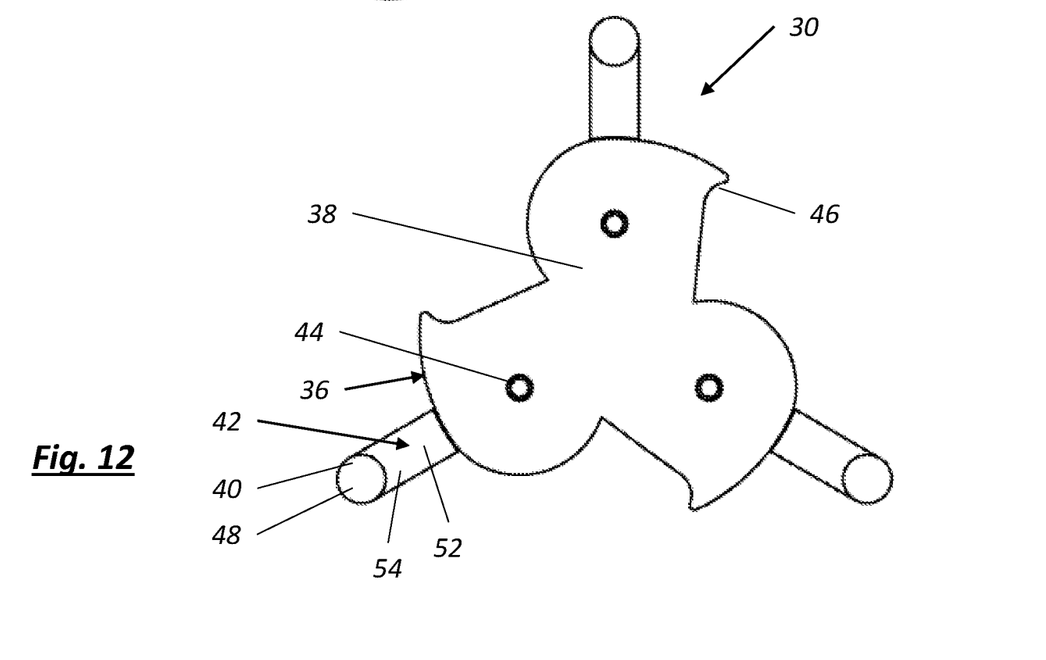
FIG. 12 is a top view of the adjustable plant stand assembly of FIG. 1, illustrated expanded.
Figure 13:
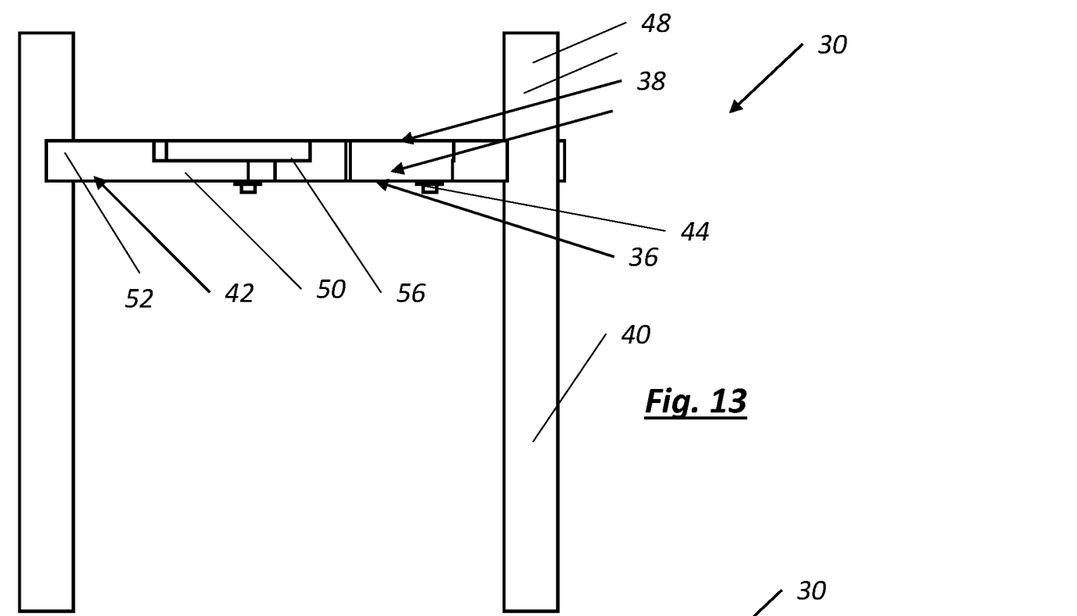
FIG. 13 is a left side view of the adjustable plant stand assembly of FIG. 1, illustrated expanded.
Figure 14:
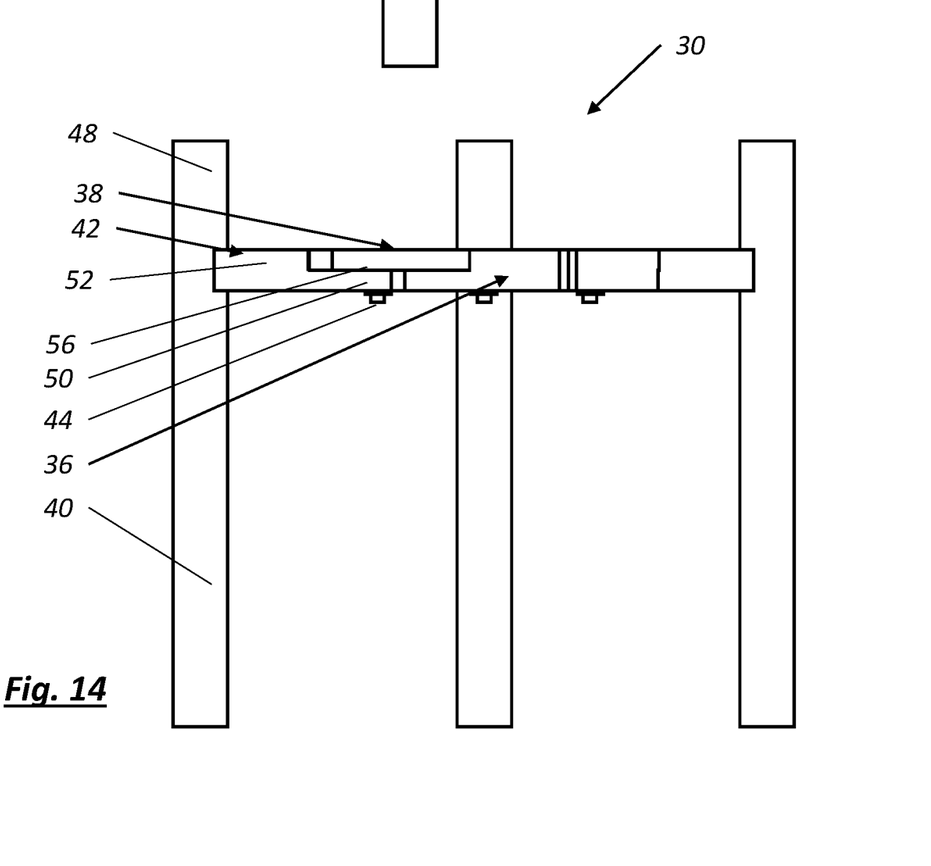
FIG. 14 is a front view of the adjustable plant stand assembly of FIG. 1, illustrated expanded.
Figure 15:
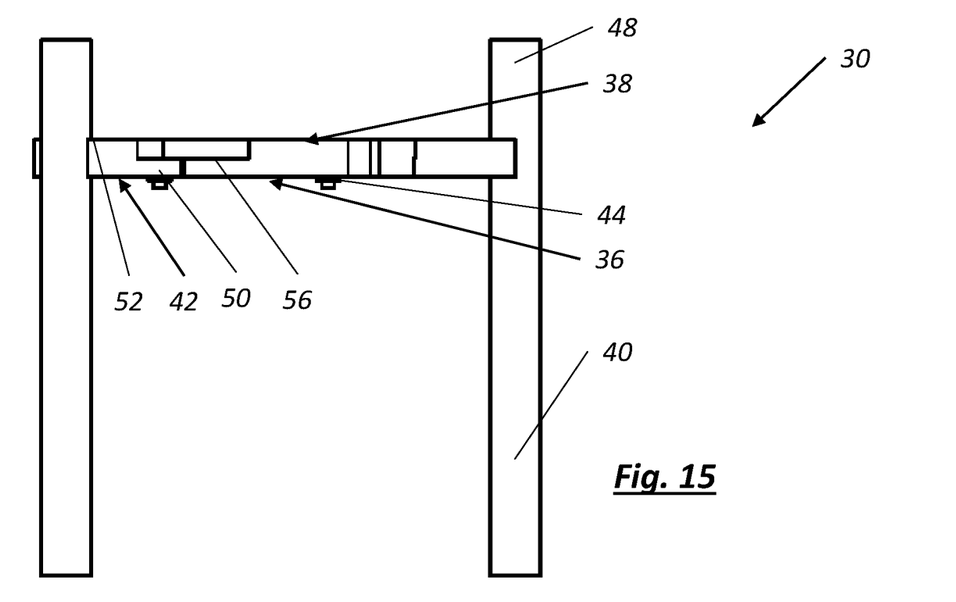
FIG. 15 is a right side view of the adjustable plant stand assembly of FIG. 1, illustrated expanded.
Figure 16:
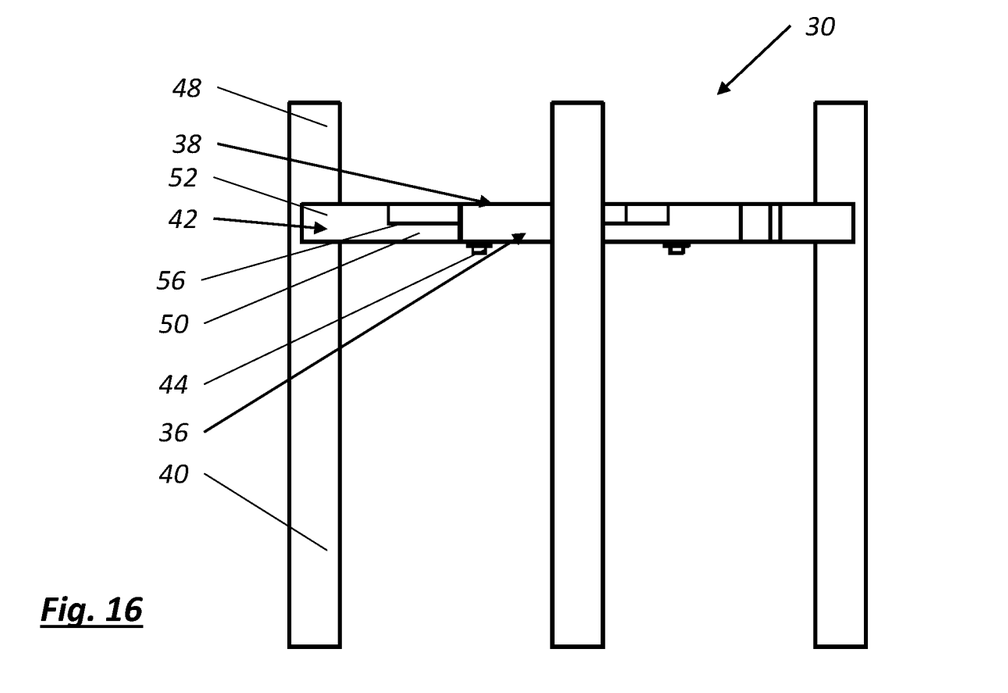
FIG. 16 is a rear view of the adjustable plant stand assembly of FIG. 1, illustrated expanded.
Figures 17, 18:
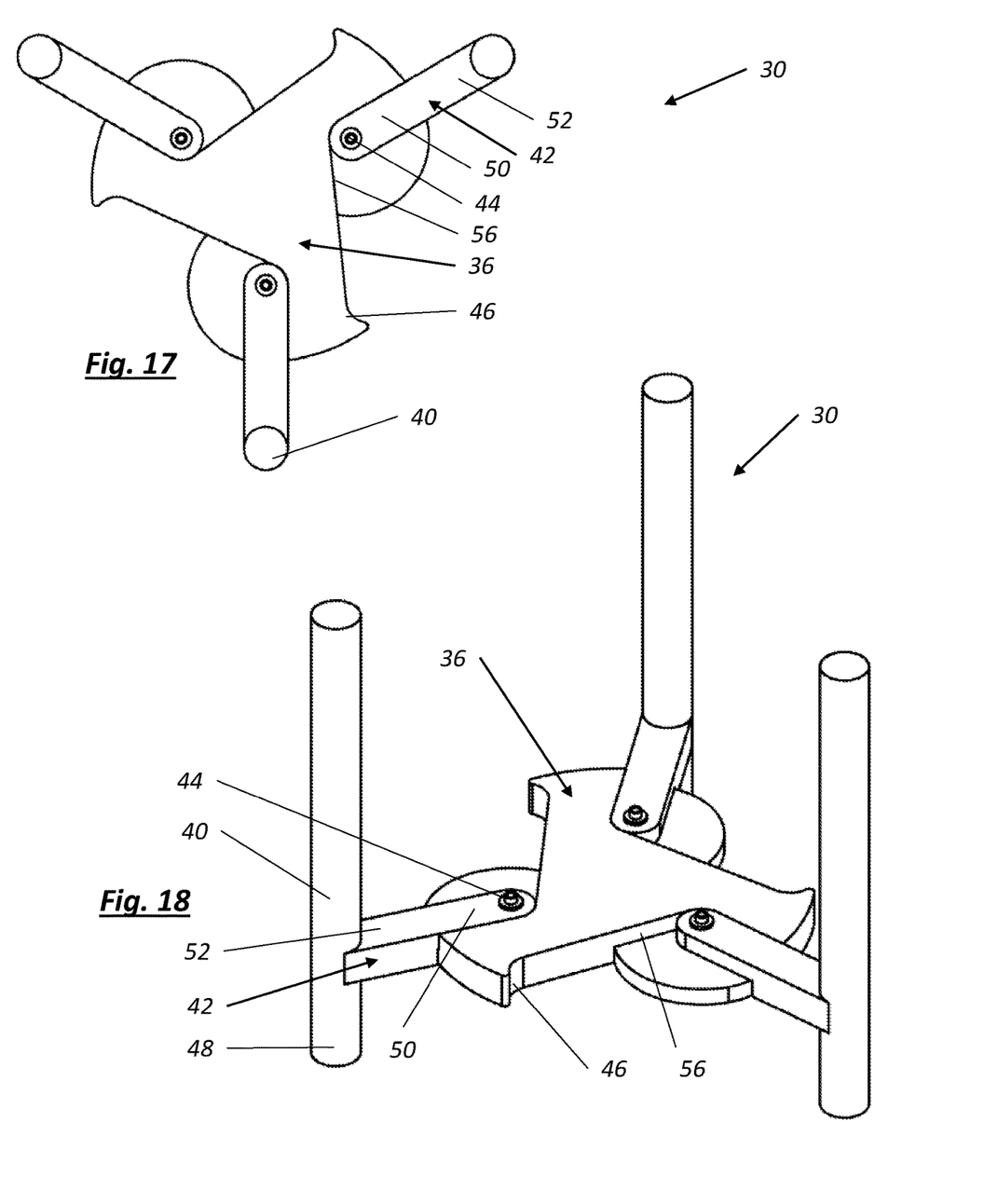
FIG. 17 is a bottom view of the adjustable plant stand assembly of FIG. 1, illustrated expanded.
FIG. 18 is a bottom perspective view of the adjustable plant stand assembly of FIG. 1, illustrated expanded.

FIG. 10 illustrates the adjustable plant stand assembly 30 in an expanded position to receive and support a larger potted planter 58. The potted planter 58 may have an outside diameter up to eighteen inches. The potted planter 58 is supported upon the baseplate support surface 38 and the link distal portion top surfaces 54.

The adjustable plant stand assembly 30 is adjustable for a range of adjustments between the fully collapsed position of FIGS. 1-9 and the fully expanded position of FIGS. 10-18 to accommodate a range of planter diameters. The fasteners 44 are under tension to compress the links 42 to the baseplate 36 to resist unwanted pivoting of the links 42 to maintain the links 42 in the adjusted positions.

According to at least one embodiment, an overall ornamental appearance of the adjustable plant stand assembly 30 is illustrated in FIGS. 2-9. According to at least another embodiment, an overall ornamental appearance of the adjustable plant stand assembly 30 is illustrated in FIGS. 11-18. According to at least another embodiment, an overall ornamental appearance of the adjustable plant stand assembly 30 may be provided without fasteners 44. According to another embodiment, an overall ornamental appearance of the baseplate 36 is provided. According to yet another embodiment, an overall ornamental appearance of one of the legs 40 with the link 42 is provided.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adjustable plant stand assembly comprising:
    a baseplate to support a planter, the baseplate having an overall profile;
    a plurality of upright supports adjustably connected to the baseplate to support the baseplate above an underlying support surface, to expand relative to the baseplate to support planters of varying sizes, and to retract relative to the baseplate within the overall profile of the baseplate;
    wherein each upright support is pivotally connected to the baseplate;
    a plurality of links, each pivotally connected to the baseplate at a pivot axis that is generally perpendicular to the baseplate;
    wherein each of the plurality of upright supports is attached to one of the plurality of links to expand and retract relative to the baseplate as the links are pivoted relative to the baseplate;
    wherein the baseplate is generally planar with a support surface; and
    wherein a portion of each of the plurality of links that is exposed outboard of the baseplate has a thickness sized to be generally coplanar with the baseplate support surface to support the planter beyond the baseplate.

2. The adjustable plant stand assembly of claim 1 further comprising a plurality of retainers extending from the plurality of upright supports above a support surface of the baseplate to retain the planter upon the baseplate.

3. The adjustable plant stand assembly of claim 1 wherein the plurality of upright supports each extend above a support surface of the baseplate to retain the planter upon the baseplate.

4. The adjustable plant stand assembly of claim 1 wherein the baseplate has a plurality of recesses formed into the overall profile sized to receive portions of the upright supports.

5. The adjustable plant stand assembly of claim 1 wherein a first plurality of recesses is formed into the overall profile of the baseplate to a limited depth to receive portions of the upright supports, while also providing a limit to a range of retraction of the plurality of upright supports.

6. The adjustable plant stand assembly of claim 5 wherein a second plurality of recesses is formed into an underside of the baseplate to provide a limit to a pivotal range of the plurality of links in a direction of expansion.

7. The adjustable plant stand assembly of claim 6 wherein the second plurality of recesses limit the pivotal range to a maximum expansion of the links.

8. The adjustable plant stand assembly of claim 1 further comprising a plurality of fasteners each pivotally connecting one of the plurality of links to the baseplate.

9. The adjustable plant stand assembly of claim 8 wherein the plurality of fasteners is each loaded in tension to provide a resistance to pivoting of the upright supports to maintain the upright supports in an adjusted position.

10. The adjustable plant stand assembly of claim 8 wherein the plurality of fasteners further comprises a plurality of rivets.

11. The adjustable plant stand assembly of claim 1 wherein the plurality of upright supports further comprises at least three upright supports.

12. The adjustable plant stand assembly of claim 1 wherein the adjustable plant stand assembly is sized to receive and support a planter base with a diameter of six inches in a retracted position.

13. The adjustable plant stand assembly of claim 1 wherein the adjustable plant stand assembly is sized to receive and support a planter base of with a diameter of eighteen inches in an expanded position.

14. An adjustable plant stand assembly comprising:
    a baseplate to support a planter, the baseplate having an overall profile;
    a plurality of upright supports adjustably connected to the baseplate to support the baseplate above an underlying support surface, to expand relative to the baseplate to support planters of varying sizes, and to retract relative to the baseplate within the overall profile of the baseplate;
    wherein each upright support is pivotally connected to the baseplate;
    a plurality of links, each pivotally connected to the baseplate at a pivot axis that is generally perpendicular to the baseplate;
    wherein each of the plurality of upright supports is attached to one of the plurality of links to expand and retract relative to the baseplate as the links are pivoted relative to the baseplate;
    wherein a first plurality of recesses is formed into the overall profile of the baseplate to a limited depth to receive portions of the upright supports, while also providing a limit to a range of retraction of the plurality of upright supports; and
    wherein a second plurality of recesses is formed into an underside of the baseplate to provide a limit to a pivotal range of the plurality of links in a direction of expansion.

15. The adjustable plant stand assembly of claim 14 further comprising a plurality of retainers extending from the plurality of upright supports above a support surface of the baseplate to retain the planter upon the baseplate.

16. The adjustable plant stand assembly of claim 14 wherein the plurality of upright supports each extend above a support surface of the baseplate to retain the planter upon the baseplate.

17. The adjustable plant stand assembly of claim 14 wherein the second plurality of recesses limit the pivotal range to a maximum expansion of the links.

18. The adjustable plant stand assembly of claim 14 further comprising a plurality of fasteners each pivotally connecting one of the plurality of links to the baseplate.

19. The adjustable plant stand assembly of claim 18 wherein the plurality of fasteners is each loaded in tension to provide a resistance to pivoting of the upright supports to maintain the upright supports in an adjusted position.

* * * * *